(12) United States Patent
Satish et al.

(10) Patent No.: US 7,870,597 B2
(45) Date of Patent: Jan. 11, 2011

(54) METHOD AND APPARATUS FOR MANAGING DIGITAL IDENTITIES THROUGH A SINGLE INTERFACE

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 916 days.

(21) Appl. No.: 11/784,835

(22) Filed: Apr. 10, 2007

(65) Prior Publication Data

US 2008/0256594 A1    Oct. 16, 2008

(51) Int. Cl.
    *H04L 9/00*    (2006.01)
    *H04L 9/32*    (2006.01)

(52) U.S. Cl. .............................. 726/1; 726/3
(58) Field of Classification Search ................. 726/1–6, 726/9–10; 713/168, 173, 175–176, 179
See application file for complete search history.

(56) References Cited

U.S. PATENT DOCUMENTS

| | | | |
|---|---|---|---|
| 7,624,428 B2 * | 11/2009 | Abhinkar et al. ............... | 726/2 |
| 2003/0172090 A1 | 9/2003 | Asunmaa et al. | |
| 2007/0204168 A1 | 8/2007 | Cameron et al. | |

FOREIGN PATENT DOCUMENTS

WO     2007075247 A1    7/2007

OTHER PUBLICATIONS

UK Intellectual Property Office Search Report dated Jun. 16, 2008 for Application No. GB0804239.2
Chappel, David, "Intruducing Windows CardSpace," dated Apr. 2006, obtained from the Internet: http://msdn.microsoft.com/en-us/library/aa480189.aspx, retrieved on Jun. 13, 2008.
Johannes Ernst's Blog, "What is Microsoft InfoCard?", dated May 18, 2005, obtained from the Internet: http://netmesh.info/jernst/Digital_Identify/what-is-msft-infocard.html, retrieved on Jun. 11, 2008.
Wikipedia definition of "Windows CardSpace," obtained from the Internet: http://en.wikipedia.org/wiki/Windows_CardSpace, retrieved on Jun. 13, 2008.

* cited by examiner

*Primary Examiner*—Hosuk Song
(74) *Attorney, Agent, or Firm*—Hunton & Williams LLP

(57) ABSTRACT

Method and apparatus for managing digital identities through a single interface is described. One aspect of the invention relates to managing digital identities related to a user. An identity policy of an entity is obtained. At least one relevant digital identity is selected from the digital identities. Each relevant digital identity includes information required by the identity policy. A selected digital identity is obtained from the relevant digital identity or identities. A representation of the selected digital identity is provided to the entity that complies with the identity policy.

17 Claims, 3 Drawing Sheets

US 7,870,597 B2

METHOD AND APPARATUS FOR MANAGING DIGITAL IDENTITIES THROUGH A SINGLE INTERFACE

BACKGROUND OF THE INVENTION

1. Field of the Invention

Embodiments of the invention generally relate to computers. More specifically, this disclosure relates to a method and apparatus for managing digital identities through a single interface.

2. Description of the Related Art

Networks, such as the Internet, are increasingly being used to securely communicate information between parties. Presently, the majority of network hosts, such as Internet web sites, authenticate users based on username and password. Typically, the user is initially asked to fill in a form provided by the web site to provide various types of information, such as mailing address, email address, username, and password. The user then submits the form to the web site to establish an account. Thereafter, the web site requires the correct username and password in order for the user to access the account. In essence, the information used to establish the account is a digital identity of the user.

Username and password-based authentication has been identified as being insecure. For example, the username and password are susceptible to inadvertent disclosure to unauthorized parties, who would the use the information to access the user's account for malicious purposes. As such, other more secure digital identities are being used. For example, current digital identity standards and systems include OpenID, Lightweight Identity Protocol (LID), secure extensible identity protocol (SXIP), MICROSOFT CARDSPACE, and the like. In addition, software packages such as NORTON CONFIDENTIAL available from SYMANTEC provide for secure storage of digital identity information and automatic filling of forms on web sites.

As the diversity of digital identity systems increases across web sites, a user is challenged to maintain many different digital identities represented in different formats and compliant with different standards. This may lead the user to eschew more secure forms of digital identity in favor of the traditional username/password identity. Accordingly, there exists a need in the art for a method and apparatus that manages digital identities of different formats using a single interface for the user.

SUMMARY OF THE INVENTION

Method and apparatus for managing digital identities through a single interface is described. One aspect of the invention relates to managing digital identities related to a user. An identity policy of an entity is obtained. At least one relevant digital identity is selected from the digital identities. Each relevant digital identity includes information required by the identity policy. A selected digital identity is obtained from the relevant digital identity or identities. A representation of the selected digital identity is provided to the entity that complies with the identity policy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
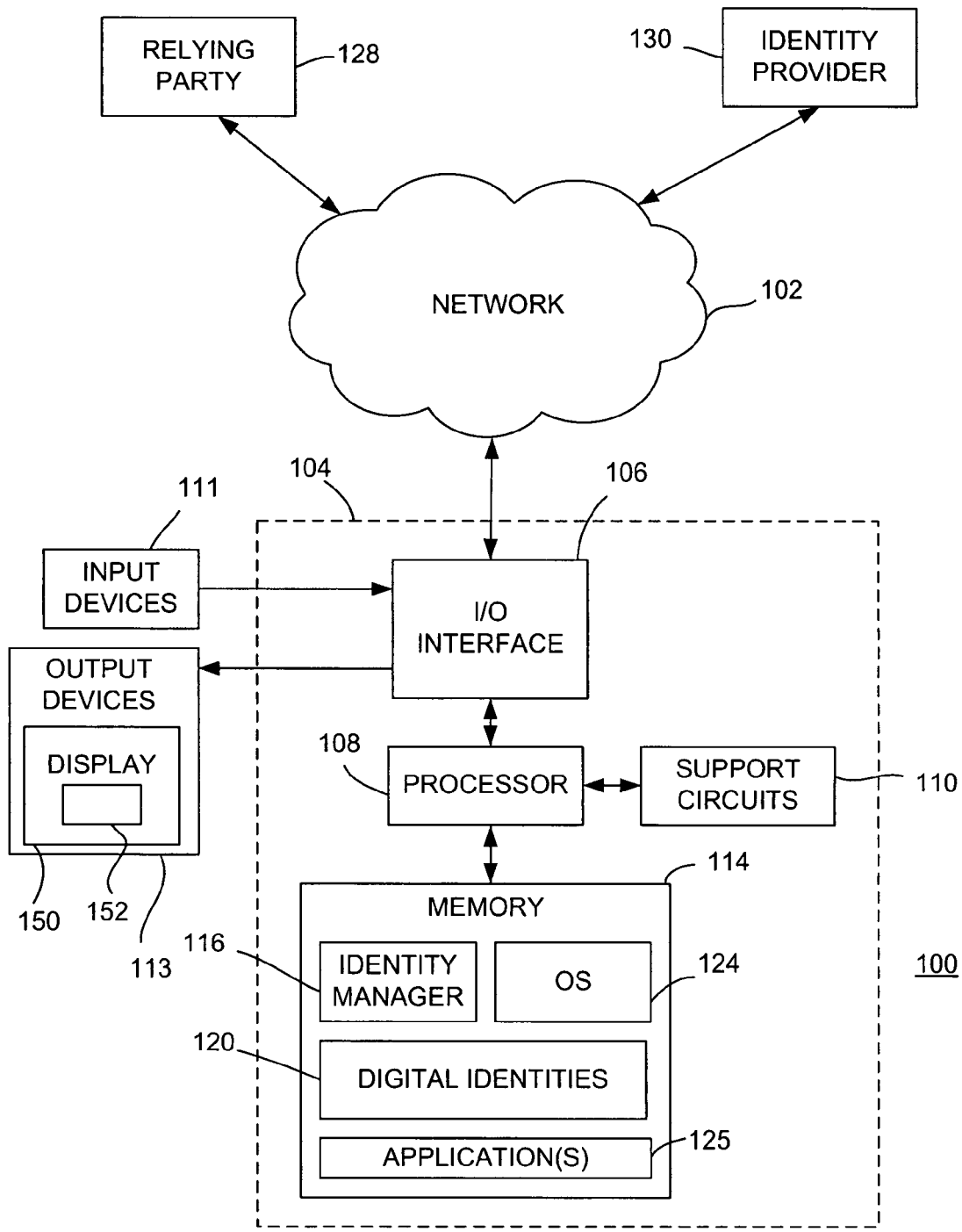
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102 coupled to a computer 104. The computer 104 illustratively includes a processor 108, a memory 114, various support circuits 110, and an I/O interface 106. The processor 108 may include one or more microprocessors known in the art. The support circuits 110 for the processor 108 include conventional cache, power supplies, clock circuits, data registers, I/O interfaces, and the like. The I/O interface 106 may be directly coupled to the memory 114 or coupled through the processor 108. The I/O interface 106 may also be configured for communication with input devices 111 and/or output devices 113, such as, network devices, various storage devices, mouse, keyboard, and the like. Notably, the output devices 113 may include a display 150. The I/O interface 106 is also coupled to the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. For example, the network 102 may be part of the Internet.

The memory 114 stores processor-executable instructions and/or data that may be executed by and/or used by the processor 108. These processor-executable instructions may comprise hardware, firmware, software, and the like, or some combination thereof. Modules having processor-executable instructions that are stored in the memory 114 may include an identity manager 116. The computer 104 may be programmed with an operating system 124, which may include OS/2, Java Virtual Machine, Linux, Solaris, Unix, HPUX, AIX, Windows, among other known platforms. At least a portion of the operating system 124 may be disposed in the memory 114. The memory 114 may include one or more of the following random access memory, read only memory, magneto-resistive read/write memory, optical read/write memory, cache memory, magnetic read/write memory, and the like, as well as signal-bearing media as described below.

The identity manager 116 is configured to manage multiple digital identities 120 for a user. The digital identities 120 as used in transactions with remote entities over the network 102. In a typical scenario, the user employs an application, such as a web browser, to initiate a transaction with a remote entity, referred to herein as a relying party 128. The relying party 128 is an entity that requests a digital identity from the user and in some way relies on digital identity. For example, the relaying party 128 may use the digital identity to authenticate the user. The relying party 128 presents an identity policy to the user application. The identity policy dictates the format and content of digital identities accepted by the relying part 128.

The identity manager 116 has access to the digital identities 120. A digital identity includes information related to the user. At least some of the information can be used to identify and authenticate the user. The information may include, for example, user credentials (e.g., username, password, etc.), address data (e.g., home address, billing address, shipping address, etc.), account number data (e.g., credit card account numbers, bank account numbers, etc.), user preferences, and/or any of a myriad of other types of data. The information of a digital identity is referred to herein as its "content."

A digital identity may be represented in one or more formats. Some of the formats are used differently when presented to the relying party 128 over the network 102. For example, in one format, the content of the digital identity is stored as a user profile. The relying party 128 presents a form or the like to a user that includes fields to be filled with information related to the user (e.g., username, password, address, etc.). This form comprises the identity policy of the relying party 128. The user profile is used to perform automatic form filling, i.e., the fields are automatically filled with the requested information. Exemplary commercial software that employs such a digital identity format is NORTON CONFIDENTIAL, available from Symantec Corporation, of Cupertino, Calif.

Another exemplary digital identity format involves the presentation of a security token (referred to as a token) by the user to the relying party 128. The relying party 128 presents a form or the like to the user that requests a token (identity policy). A token includes one or more claims, each of which includes some part of the total information conveyed by the digital identity. For example, a token may include claims for a username, a password, credit card numbers, and/or a myriad of other types of information. The tokens may be in a variety of different formats, such as X.509 certificates, Kerberos tickets, and the like. A token may also be created using a standard language, such as the Security Assertion Markup Language (SAML). Exemplary software that employs tokens is MICROSOFT CARDSPACE, which provides an easy to understand metaphor. CARDSPACE enables users to create "cards" (i.e., objects) that represent their profile information, which in turn is used to create security tokens that can be submitted to entities over the network 102.

Some token-based identity formats, such as CARDSPACE, provide for two types of digital identities: self-managed identities and managed identities. To distinguish between the two types of identities, it is useful to define an identity provider, which is an entity that provides a digital identity for the user. A self-managed identity is one where the user and the identity provider are one and the same. For example, if a user is creating an account at an online provider, such as AMAZON.COM, than the user is creating his or her own identity (e.g., a username, password, address, etc.). A self-managed identity may be backed by a public key infrastructure (PKI). As is well known in the art, a PKI provides for asymmetric encryption using a public/private key pair. A security token that conveys a self-managed identity is signed using a user's private key, and the relying party 128 authenticates the security token as originating from the user using the user's public key. Such an authentication mechanism is well known in the art.

A managed identity is a stronger form of digital identity in that the information is backed by a third party and hence is assumed to be more trustworthy. That is, an identity provider 130 external to the user provides the digital identity to the user. In the case of managed identities, some or all of the content of the digital identity is not stored on the computer 104. Rather, some or all of the content is stored and managed by the identity provider 130. Thus, the user requests and receives a security token from the identity provider 130, which in turn is submitted to the relying party 128.

Another type of digital identity representation in addition to form filling and token-based representations involve the use of uniform resource identifiers (URIs). Such exemplary identity systems include OpenID, Lightweight Identity protocol (LID), sensible extensible identity protocol (SXIP), and the like. In URI-based systems, the identity provider 130 provides a URI for the user that can be used to authenticate the user to the relying party 128. The user submits the URI to the relying party 128 and the relying party 128 transacts with the identity provider 130 to confirm ownership of the URI.

In general, the format of a digital identity is referred to as a "representation" of the digital identity. That is, a given digital identity may have one or more representations (e.g., a user profile for form filling, a security token, URI-based, or the like). One or more of the digital identities 120 may be created using one or more applications 125. For example, some of the digital identities 120 may have been created using CARDSPACE. Others of the digital identities 120 may have been created using NORTON CONFIDENTIAL. As described below, one or more of the digital identities 120 may be created using the identity manager 116.

Notably, in some embodiments, the identity manager 116 is configured to import existing ones of the digital identities 120 (e.g., digital identities created by the application(s) 125). Typically, each imported digital identity includes a single representation, although more than one representation may be provided. In either case, for each imported digital identity, the identity manager 116 may create one or more alternative representations thereof. For some digital identities (e.g., self-managed), the identity manager 116 uses the content stored on the computer 104 to create the alternative representations. If all or a portion of the digital identity is stored external to the computer, such as at the identity provider 130, then the identity manager 116 may request the content from the identity provider 130 (e.g., for managed identities).

The alternative representations of a digital identity may be created automatically by the identity manager 116 or in response to a command from the user. For example, a given digital identity may include a user profile to be used for form filling. The identity manager 116 may use the user profile (content of the digital identity) to create a self-managed token-based identity (e.g., a self-managed card in CARDSPACE). The identity manager 116 may also perform the reverse. That is, information in a self-managed token-based identity may be used to create a user profile for form filling. The identity manager 116 may also be used to create a digital identity having multiple representations. In any case, some or all of the digital identities 120 may be configured with multiple representations by the identity manager 116.

For each transaction with a relying party, the identity manager 116 is configured to obtain an identity policy. To identity manager 116 determines the information required by the identity policy and identifies one or more relevant digital identities. The relevant digital identities include content that can be used to satisfy the identity policy. The relevant digital identities may be presented to the user for selection as visual representations 152 on the display 150. The identity manager 116 may disable for use with the relying party 128 those digital identities that are not relevant with respect to the identity policy (e.g., digital identities that do not have the required content). These disabled digital identities may be hidden from the user on the display 150 or represented in a manner that indicates they are disabled (e.g., via "grayed out" visual representations). The user may select a digital identity from among the relevant digital identities to be presented to the relying party 128. Alternatively, the identity manager 116 may be configured by the user or otherwise to automatically select one of the relevant digital identities.

In some embodiments, the identity manager 116 determines the relevant digital identities irrespective of the format required by the identity policy. That is, the identity manager 116 only determines if a digital identity has the required content for the identity policy. If the selected digital identity is not in the format required by the identity policy, the identity manager 116 may create a representation of the digital identity that does comply with the identity policy from the content thereof. Alternatively, as described above, the identity manager 116 may have already created alternative representations for the selected digital identity. If the representation required by the identity policy has already been created for the selected digital identity, this representation is selected by the identity manager 116 for transmission to the relying party 128.

In some embodiments, the identity manager 116 determines the relevant digital identities based on content and format. For example, as described above, the identity manager 116 may have created alternative representations for the digital identities 120. When determining relevant digital identities, the identity manager 116 may select only those identities that have the required content and the required representation. The identity manager 116 then presents these relevant identities to the user. For example, it may be the case that some digital identities are not capable of alternative representations. In such case, the identity manager 116 may not be able to generate the correct representation "on-the-fly," as described above. Thus, the identity manager 116 does not show digital identities that cannot be translated into the required format to the user.

In some embodiments, the identity policy of the relying party 128 may support a plurality of different representations (e.g., form filling and token-based mechanisms). When the user selects a digital identity to present to the relying party 128, the identity manager 116 selects one of the representations as a most secure representation and designates this representation to be presented to the relying party 128. For example, the relying party 128 may accept both form filling and token-based identity formats. The identity manager 116 may select the token-based format as being more secure and thus use a token-based representation of the selected digital identity. For the selected identity, the selected most secure format may have already been created, or may be created on-the-fly, as described above. The identity manager 116 may perform this format selection automatically. Alternatively, the identity manager 116 may present the different formats to the user for selection. The identity manager 116 may provide recommendations as to the most secure representation to guide the user in his or her selection.

In some embodiments, a digital identity may include a plurality of user credentials associated with the same information. For example, a digital identity may include address information (e.g., mailing address and email address) that is capable of use with multiple relying parties. However, the user establishes different credentials with each of the relying parties (e.g., different usernames and passwords). In such case, a single digital identity is created that includes the address information (or any other information common among the entities) and the multiple credentials. Alternatively, a user may use multiple credentials with a single relying party. In any case, the identity manager 116 may be configured to manage these credentials for a given digital identity, including adding and removing credentials over time. The identity manager 116 may also be configured to select one of the credentials for inclusion in the representation of the digital identity provided to the relying party 128. For example, when the relevant digital identities are presented to the user, the fact that multiple credentials exist for any one of the digital identities may be conveyed to the user (e.g., a visual cue on the display 150). This allows the user to both select the digital identity and select the desired credential for use with the relying party 128. If a digital identity has multiple credentials, one of the credentials may be designated as a default credential such that the identity manger 116 will use the default credential absent selection by the user.

In some embodiments, the identity manger 116 analyzes the security of the transaction with the relaying party 128 to establish a confidence level of the relying party 128. The confidence level may be established using a heuristic or other type of rule-based engine that analyzes various attributes of the relying party 128, such as the reputation of the relying party 128, the security mechanism used to exchange data, the length of time the relying party 128 has been in business, the number of users that transact with the relying party 128, and the like. Such information may be determined by the identity manager 116 locally, obtained from third-parties (e.g., a third-party site that rates reputations of other sites), or from the relying party 128 itself, or from a combination of such sources.

The identity manager 116 uses the confidence level to select a particular digital identity to be submitted. For example, the user may establish a digital identity having real identity information ("real digital identity") and an anonymous digital identity. The real digital identity includes actual identity information for the user. The anonymous digital identity may include fake identity information (e.g., a fake e-mail address, a fake name, etc.). The identity manager 116 will present either the real digital identity or the anonymous digital identity to the user based on the determined confidence level for the relying party 128. For example, if a high confidence level has been determined, the real digital identity may recommended to the user for selection. If a low confidence level has been determined, the anonymous digital identity may be recommended to the user for selection. The identity manager 116 may allow the user to select either digital identity regardless of the recommendation. This identity selection based on confidence level may be performed in addition to the identity selection mechanisms described above (i.e., selection of identity based on policy and protocol of the relying party).

In some embodiments, the anonymous digital identity includes real identity information, but with privacy shielding features. For example, the anonymous digital identity may include a forwarding address, a forwarding e-mail address, and/or forwarding phone number that does not reveal anything about the user's actual address, e-mail address, or phone number. In another example, the anonymous digital identity includes a one time use credit card number. After the relying party 128 uses the credit card number, it is no longer valid. In another example, the anonymous digital identity a site-specific e-mail address. That is, the user establishes an e-mail address for use with a specific relying party. The site-specific email address does not reveal the user's real e-mail address.

The identity manager 116 may use various visual representations 152 to show the digital identities. In general, the identity manager 116 shows a digital identity as an object (e.g., a card). In some embodiments, a given object may be linked to multiple representations of a digital identity. Thus, the user is not inundated with lots of objects. Alternatively, an object may be just one representation of a digital identity (e.g., one object for a form filling digital identity and another object for a token-based representation of that same digital identity).

Figure 2:
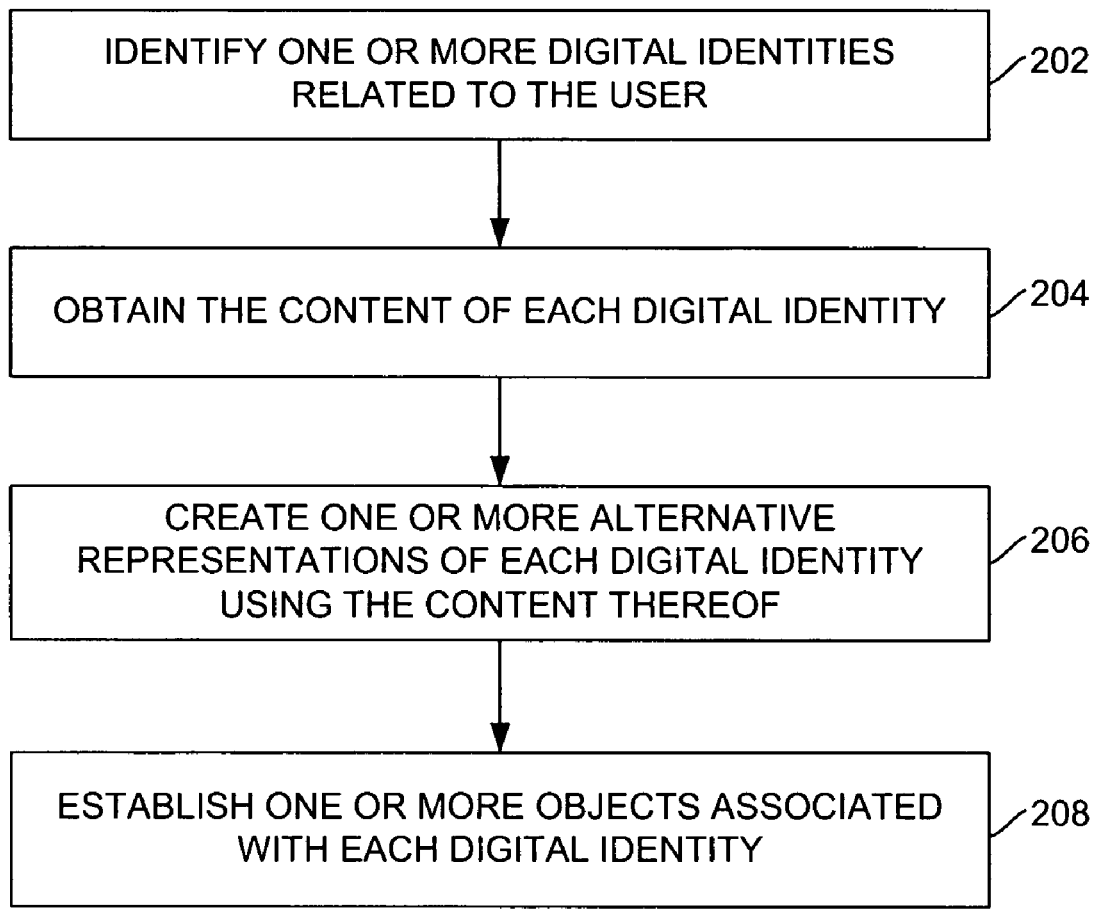
FIG. 2 is a flow diagram depicting an exemplary embodiment of a method for managing digital identities related to a user in accordance with one or more aspects of the invention.

FIG. 2 is a flow diagram depicting an exemplary embodiment of a method 200 for managing digital identities related to a user in accordance with one or more aspects of the invention. The method 200 begins at step 202, where one or more digital identities for the user are identified. At step 204, content of each of the digital identities is obtained. For some identities, the content may be obtained locally from the computer storing the identities. For other managed identities, the content may be obtained from an identity provider. At step 206, the content for each digital identity is used to create one or more alternative representations for each digital identity. At step 208, one or more objects is/are established for each digital identity. The objects may be visual represented to the user. In some embodiments, each digital identity and its representations are linked with a single object. In other embodiments, an object is established for each representation of each digital identity. The method 200 may be performed by the identity manager 116 to import and/or otherwise establish the digital identities 120.

Figure 3:
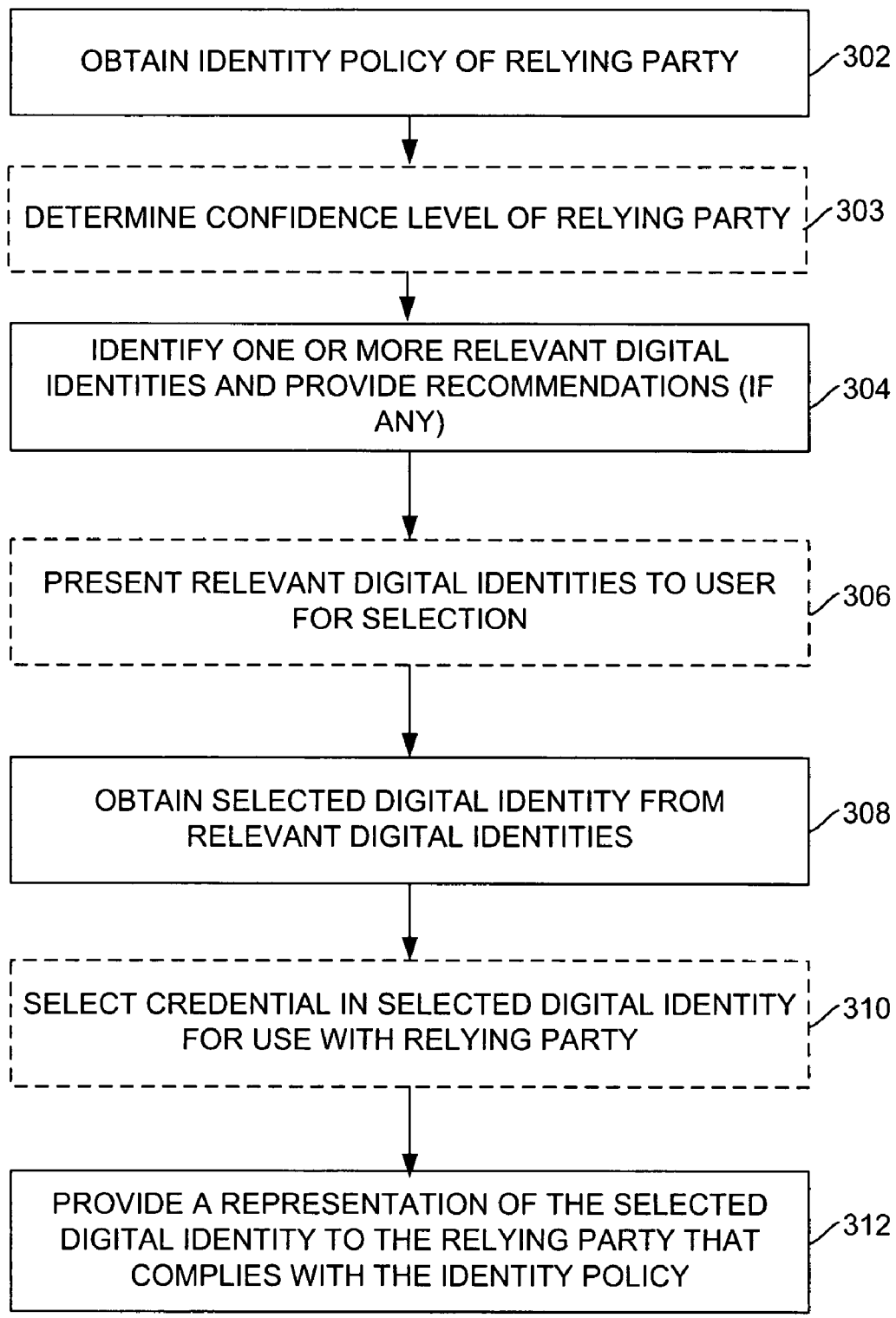
FIG. 3 is a flow diagram depicting an exemplary embodiment of a method of providing a digital identity of a user to a relying party in accordance with one or more aspects of the invention.

FIG. 3 is a flow diagram depicting an exemplary embodiment of a method 300 of providing a digital identity of a user to a relying party in accordance with one or more aspects of the invention. The method 300 begins at step 302, where an identity policy of the entity is obtained. As described above, the identity policy dictates the content and format of the requested digital identity. At step 303, a confidence level for the entity is determined. At step 304, one or more relevant digital identities are identified. Each relevant digital identity includes information required by the identity policy. In one embodiment, each relevant identity includes content required by the identity policy. In another embodiment, each relevant identity includes a representation and content required by the identity policy. The relevant digital identities may also be identified based on the determined confidence level for the entity. For example, if confidence is high, the relevant digital identities may only include digital identities having real identity information. On the other hand, if confidence is low, the relevant digital identities may be ones with anonymous information (i.e., either fake information or privacy shielded real information). At step 306, the relevant identities may be presented to the user for selection. In one embodiment, other non-relevant digital identities are disabled for use with the relying party and may be presented as such to the user. In some embodiments, the relevant identities are presented to the user with recommendations. For example, if at step 303 confidence was determined to be high, those identities having real information may be recommended. Alternatively, if confidence is low, those identities having anonymous information may be recommended. In another example, if the entity accepts two kinds of digital identities, the more secure one may be recommended to the user.

At step 308, a selected digital identity is obtained from the relevant digital identities. The selected digital identity may be established by the user at step 306. Alternatively, a digital identity may be automatically selected from the relevant digital identities. At step 310, a credential may be selected in the selected digital identity. As described above, a digital identity may include multiple credentials. A default one of the credentials may be automatically selected. Alternatively, the user may select one of the credentials. At step 312, a representation of the selected digital identity that complies with the identity policy is provided to the relying party. In one embodiment, the selected digital identity includes a first representation, which is translated to a second representation that complies with the identity policy of the relying party. In another embodiment, the selected digital identity includes a plurality of representations, at least one of which complies with the identity policy of the relying party. The representation that complies with the identity policy is selected. In some embodiments, the identity policy supports multiple representations and the selected digital identity includes multiple representations, a plurality of which comply with the identity policy. The representation provided to the relying party may be the one that is deemed most secure among all of the possible representations. The method 300 may be performed by the identity manager 116 when transacting with a relying party.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method of managing digital identities related to a user, comprising:
    obtaining an identity policy of an entity;
    identifying at least one relevant digital identity from the digital identities, each of the at least one relevant digital identity including information required by the identity policy;
    obtaining a selected digital identity of the at least one relevant digital identity;
    providing a representation of the selected digital identity that complies with the identity policy to the entity;
    presenting the at least one relevant digital identity to the user for selection of the selected digital identity;
    determining a confidence level of the entity; and
    presenting a recommended one of the at least one relevant digital identity to the user based on the confidence level.

2. The method of claim 1, further comprising:
    disabling for use with the entity each of the digital identities other than the at least one relevant digital identity.

3. The method of claim 1, wherein the recommended digital identity includes real identity information for the user if the confidence level is high or anonymous identity information for the user if the confidence level is low.

4. The method of claim 1, wherein the selected digital identity includes a first representation, and wherein the step of providing comprises:
    translating the first representation of the selected digital identity to the representation that complies with the identity policy.

5. The method of claim 1, wherein the selected digital identity includes a first representation, and wherein the method further comprises:
creating at least one alternative representation to the first representation of the selected digital identity to create a plurality of representations.

6. The method of claim 5, wherein the step of providing comprises:
selecting one of the plurality of representations as the representation that complies with the identity policy.

7. The method of claim 1, wherein each of the digital identities includes at least one representation, and wherein the at least one representation of each of the at least one relevant digital identity includes the representation that complies with the identity policy.

8. The method of claim 1, wherein the information in the selected digital identity includes a plurality of credentials, and wherein the method further comprises:
selecting one of the plurality of credentials for inclusion in the representation of the selected digital identity provided to the entity.

9. The method of claim 1, wherein the identity policy supports a plurality of representations, wherein the selected digital identity includes the plurality of representations, and wherein the method further comprises:
selecting one of the plurality of representations as a most secure representation; and
designating the most secure representation as the representation to be provided to the entity.

10. Apparatus for managing digital identities related to a user, comprising:
means for obtaining an identity policy of an entity;
means for identifying at least one relevant digital identity from the digital identities, each of the at least one relevant digital identity including information required by the identity policy;
means for obtaining a selected digital identity of the at least one relevant digital identity;
means for providing a representation of the selected digital identity that complies with the identity policy to the entity;
means for presenting the at least one relevant digital identity to the user for selection of the selected digital identity;
means for determining a confidence level of the entity; and
means for presenting a recommended one of the at least one relevant digital identity to the user based on the confidence level.

11. The apparatus of claim 10, wherein the selected digital identity includes a first representation, and wherein the means for providing comprises:
means for translating the first representation of the selected digital identity to the representation that complies with the identity policy.

12. The apparatus of claim 10, wherein the selected digital identity includes a first representation, and wherein the method further comprises:
means for creating at least one alternative representation to the first representation of the selected digital identity to create a plurality of representations.

13. The apparatus of claim 12, wherein the means for providing comprises:
means for selecting one of the plurality of representations as the representation that complies with the identity policy.

14. The apparatus of claim 10, wherein the identity policy supports a plurality of representations, wherein the selected digital identity includes the plurality of representations, and wherein the method further comprises:
means for selecting one of the plurality of representations as a most secure representation; and
means for designating the most secure representation as the representation to be provided to the entity.

15. A computer system, comprising:
a memory configured to store digital identities related to a user; and
an interface configured to communicate with an entity on a network; and
an identity manager configured to:
obtain an identity policy of the entity through the interface;
identify at least one relevant digital identity from the digital identities, each of the at least one relevant digital identity including information required by the identity policy;
obtain a selected digital identity of the at least one relevant digital identity;
provide a representation of the selected digital identity that complies with the identity policy to the entity through the interface;
present the at least one relevant digital identity to the user for selection of the selected digital identity;
determine a confidence level of the entity; and
present a recommended one of the at least one relevant digital identity to the user based on the confidence level.

16. The computer system of claim 15, further comprising:
a display;
wherein the identity manager is further configured to present the at least one relevant digital identity to the user using visual representations on the display for selection of the selected digital identity.

17. The computer system of claim 15, wherein the selected digital identity includes a first representation, and wherein the identity manager is configured to create at least one alternative representation to the first representation of the selected digital identity to create a plurality of representations.

* * * * *